(12) United States Patent
Keegan et al.

(10) Patent No.: US 8,003,720 B2
(45) Date of Patent: Aug. 23, 2011

(54) METHOD AND COMPOSITIONS FOR REDUCING PLATE-OUT IN THE MANUFACTURE OF PLASTIC ARTICLES

(75) Inventors: Dave Keegan, Greenville, SC (US); Shawn R. Sheppard, Boiling Springs, SC (US); Dale W. Chandler, Spartanburg, SC (US); Jiannong Xu, Spartanburg, SC (US); Jiang Li, Spartanburg, SC (US); Keith Alan Keller, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 1393 days.

(21) Appl. No.: 11/045,760

(22) Filed: Jan. 28, 2005

(65) Prior Publication Data

US 2006/0173109 A1 Aug. 3, 2006

(51) Int. Cl.
*C08K 5/15* (2006.01)
*C08F 2/44* (2006.01)
*C08F 2/00* (2006.01)
*C08F 210/00* (2006.01)

(52) U.S. Cl. ......... 524/109; 524/849; 526/204; 526/348
(58) Field of Classification Search .................. 524/849, 524/109; 526/204, 348
See application file for complete search history.

(56) References Cited

U.S. PATENT DOCUMENTS

| | | | | |
|---|---|---|---|---|
| 4,016,118 | A | 4/1977 | Hamada et al. | 260/17.4 |
| 4,251,407 | A | 2/1981 | Schroeder et al. | 260/23 R |
| 4,314,039 | A | 2/1982 | Kawai et al. | 525/1 |
| 4,371,645 | A | 2/1983 | Mahaffey, Jr. | 524/108 |
| 4,532,280 | A | 7/1985 | Kobayashi et al. | 524/108 |
| 4,977,033 | A | 12/1990 | Akao | 428/516 |
| 5,023,120 | A | 6/1991 | Akao | 428/35.9 |
| 5,049,605 | A | 9/1991 | Rekers | 524/108 |
| 5,084,316 | A | 1/1992 | Akao | 428/36.92 |
| 5,443,872 | A | 8/1995 | Akao et al. | 428/35.7 |
| 6,238,615 | B1 | 5/2001 | Kobayashi et al. | 264/537 |
| 6,245,843 | B1 | 6/2001 | Kobayashi et al. | 524/109 |
| 6,593,427 | B2 | 7/2003 | Kobayashi et al. | 525/194 |
| 6,673,856 | B1 | 1/2004 | Mentink | 524/110 |
| 2003/0109610 | A1 | 6/2003 | Nomoto et al. | 524/108 |
| 2006/0100324 | A1 | 5/2006 | Horie | |

FOREIGN PATENT DOCUMENTS

| | | | |
|---|---|---|---|
| EP | 1505109 | A1 | 2/2005 |
| JP | 58-067738 | * | 4/1983 |
| JP | 2-59587 | | 2/1990 |
| JP | 7-278362 | | 10/1995 |
| JP | 09-104788 | A | 4/1997 |
| JP | 10-30165 | | 3/1998 |
| JP | 10-060165 | * | 3/1998 |
| JP | 1060165 | | 3/1998 |
| JP | 2001-261971 | | 9/2001 |
| JP | 2002-332359 | | 11/2002 |
| JP | 2003-96246 | | 4/2003 |
| JP | 3463841 | B2 | 11/2003 |
| WO | WO 02/34827 | | 2/2002 |
| WO | WO 03/093360 | | 11/2003 |
| WO | 2004046241 | A1 | 6/2004 |

OTHER PUBLICATIONS

Ikeda, Heat-stable dibenzylidenesorbitol-based compositions and transparent polyolefin resins containing them with reduced odor. Chemical Abstracts Service, Columbus, Ohio. XP002382718. Abstract.
International Search Report. International application No. PCTUS2006002592, (2006).

* cited by examiner

*Primary Examiner* — William K Cheung
(74) *Attorney, Agent, or Firm* — Robert M. Lanning

(57) ABSTRACT

Chemical additives disclosed for reducing "plate-out" which have applications in polymers, such as polyolefins. It is possible to provide for a composition and a process for producing parts, sheet and film from polyolefin extrusion applications wherein the polyolefins are processed with a minimal quantity of "plate-out." A polyolefin composition may contain a sorbitol-based clarifying system of a derivative of Dibenzylidene, along with one or more co-additives to achieve a reduction in undesirable plate-out.

11 Claims, No Drawings

METHOD AND COMPOSITIONS FOR REDUCING PLATE-OUT IN THE MANUFACTURE OF PLASTIC ARTICLES

BACKGROUND OF THE INVENTION

Polypropylene is commonly used in the packaging industry due to its excellent balance of properties and cost. One of the most common methods of manufacture using polypropylene is the extrusion process, in which the polyolefin is melted in an extruder well in excess of its melting point, and passed through a die which shapes the polymer into a flat sheet, a hollow tube, etc for formation into a final part. In this extrusion process there are several challenges. One of the challenges experienced in the extrusion of polypropylene is a condition called "plate-out". "Plate-out" refers to the undesirable deposition of additives or low molecular weight polymers upon processing equipment during the processing of polypropylene containing additives. Such additives could include nucleating agents, clarifiers, slip agents, anti-static agents, acid scavengers, colorants, ultraviolet light absorbers and perhaps others. Such additives are compounded into the polypropylene before the production of a plastic part.

In general, it is desirable to avoid "plate-out". One reason is that "plate-out" causes manufacturing malfunctions, quality problems and downtime. This may occur during the sheet extrusion process when a plastic sheet is being formed between multiple polishing rolls. This undesirable "plate-out" of material upon a polishing roll can cause the polyolefin sheet not to remove itself as it should from the forming roll. When the sheet improperly adheres to the roll, it can wrap around the roll, disrupting manufacturing operations and causing downtime. This situation can be costly and difficult. Also, the build-up of "plate-out" on the polishing rolls can degrade the optical properties of the sheet, most notably surface gloss.

Various techniques have been applied to control or reduce "plate-out", but many such techniques have been only partially successful. This invention is directed toward a method that is capable of eliminating the problems associated with "plate-out" in the formation of plastic parts.

U.S. Pat. No. 4,251,407 to Schroeder et al. is directed to the use of finely divided zinc oxide in polypropylene. The zinc oxide is stated to act as an acid acceptor, and is believed to interfere with migration of low molecular weight polymer to the surface of the polymer melt, thereby preventing the "plate-out" of such material on the processing equipment. One disadvantage of the process shown in the Schroeder patent is that zinc oxide negatively impacts the clarity of the plastic parts produced in the process. Therefore, although zinc oxide may provide certain "plate-out" advantages, those advantages may be outweighed by the undesirably low clarity of the plastic parts made, rendering it unusable in systems with clarifying agents. Moreover, other solid particulates are known to function similarly, including talc and calcium carbonate, though they also will negatively affect the clarity performance of a polyolefin part.

It is commonly known in the polypropylene industry that the addition of lubricants, such as glycerol monostearate (GMS) or calcium stearate, in small amounts (1000 ppm and lower) can reduce "plate-out" by reducing shear internally and lowering the amount of low molecular weight polymer and volatile additives driven off during the plastification process. While somewhat effective, GMS and calcium stearate, as well as other lubricants in this class, can not completely eliminate plate-out, and if used at too high a level can actually make plate-out worse. These molecules also tend to migrate through the plastic in the final part, depositing on the surface of the part and creating a white film, referred to as bloom. This is an undesirable side-effect of this method.

Fluoropolymers such as Dynamar (sold commercially by Dyneon) and Viton Free Flow (sold commercially by Dupont-Dow Elastomers) are highly effective in reducing plate-out in polyolefin film extrusion. These additives, as written by Bossche et al. migrate through the polymer to the polymer-metal interface, creating a layer that favors polymer slip. This layer allows for reduced shear and reduced processing temperatures, thereby reducing migration of additives from the polymer melt. Furthermore, these additives reduce the surface energy of the die wall, reducing the affinity of the additives and degraded polymer for the metal surface. These additives, while effective in films, tend to be expensive and adversely affect clarity in thicker parts.

It would be desirable to develop processes, compounds, or compositions that are capable of reducing or eliminating "plate-out," while not negatively impacting the transparency of the given polyolefin article in the initial or post-manufactured state. The present invention is aimed at such a system.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

In the present invention, co-additives used to improve the plate-out performance of polyolefins containing sorbitol-based clarifiers are selected from the group consisting of homopolymers of ethylene oxide, copolymers containing ethylene oxide segments, and polycaprolactone and its derivatives and any combinations of the above compounds. Articles of manufacture, such as thermoplastic, polyolefin, or the polymeric articles may be made using the compositions provided herein.

In one embodiment, the polyolefin contains at least one co-additive of ethylene oxide homopolymer with a molecular weight ranging from 200 to 3000, said co-additive being provided in a loading level not to exceed 5000 parts per million. The co-additives may be plasticized with the polyolefin resin, diacetal, and co-additive into an article of manufacture.

In yet another embodiment, the co-additive may be a copolymer containing segments of ethylene oxide, said segments having a molecular weight ranging from about 200 to about 10000 and an ethylene oxide percentage ranging from about 10% to about 95% with a loading level of said co-additive not to exceed about 5000 parts per million.

In yet another embodiment, the co-additive also may be chosen from the group consisting of polycaprolactone and its derivatives, including polycaprolactone diol, polycaprolactone triol, polycaprolactone tetraol, etc. with molecular weight ranging from 300 to 10000 with a loading level not to exceed 5000 parts per million.

It is believed that the additives disclosed in this application for reducing "plate-out" could have applications in polyolefins. Examples have been prepared below that employ commercially available polypropylene homopolymer and propylene-ethylene copolymers.

The object of the invention is to provide for a composition and a process for producing parts, sheet and film from polyolefin extrusion applications where the polyolefins process with a minimal quantity of "plate-out."

The present invention, in one aspect thereof, relates to a polyolefin composition containing a sorbitol-based clarifying system, including but not limited to the derivatives of dibenzylidene sorbitols listed below, that processes adequately in polymer processing applications, including extrusion blow molding, sheet extrusion, etc., with minimal plate-out generation. This minimal plate-out generation is accomplished through the use of a co-additive incorporated with the sorbitol-based clarifier. These additives then, upon cooling, do not negatively impact optical properties of the final part.

The clarifying agents of interest include diacetals of sorbitol and xylitol derivatives having the general formula (I)

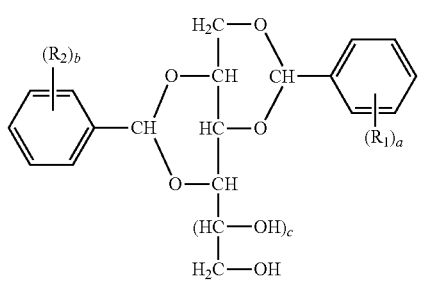

where $R_1$ and $R_2$ are the same or different and each represents a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, and a 4 or 5 membered alkyl group forming a carbocyclic ring with adjacent carbon atoms of the unsaturated parent ring; a and b each represent an integer of 1 to 5; c represents 0 or 1. Of particular interest are clarifying agents where p is 1 and $R_1$ and $R_2$ are selected from $C_{1-4}$ alkyl, chlorine, bromine, thioether and a 4-membered alkyl group forming a carbocyclic ring with adjacent carbon atoms of the unsaturated parent ring. Examples of specific clarifiers include: dibenzylidene sorbitol, di(p-methylbenzylidene) sorbitol, di(o-methylbenzylidene)sorbitol, di(p-ethylbenzylidene) sorbitol, bis(3,4-dimethylbenzylidene)sorbitol, bis(3,4-diethylbenzylidene) sorbitol, bis(5',6',7',8'-tetrahydro-2-naphthylidene)sorbitol, bis(trimethylbenzylidene)xylitol, and bis(trimethylbenzylidene)sorbitol. Also within the scope of the present invention are compounds made with a mixture of aldehydes, including substituted and unsubstituted benzaldehydes.

The clarifying agents of interest also include diacetals of sorbitol and xylitol having the general formula (II).

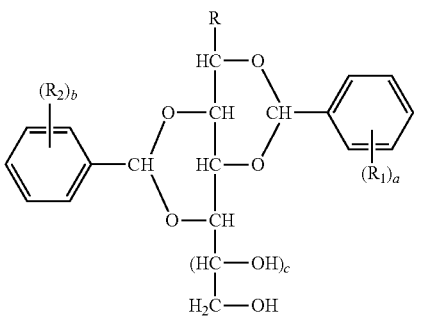

where R is selected from the group consisting of: alkenyls, alkyls, alkoxys, hydroxyl alkyls, and alkyl halides, and derivatives thereof; $R_1$ and $R_2$ are the same or different and each represents a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, and a 4 or 5 membered alkyl group forming a carbocyclic ring with adjacent carbon atoms of the unsaturated parent ring; a and b each represent an integer of 1 to 5; c represents 0, 1 or 2. Of particular interest are clarifiers where R is methyl, ethyl, propyl, butyl, allyl, or crotyl, $R_1$ and $R_2$ are selected from $C_{1-4}$ alkyl, chlorine, bromine, thioether and a 4-membered alkyl group forming a carbocyclic ring with adjacent carbon atoms of the unsaturated parent ring. Examples of specific clarifiers include: 1,3:2,4-bis(4-ethylbenzylidene)-1-allyl-sorbitol, 1,3:2,4-bis(3'-methyl-4'-fluoro-benzylidene)-1-propyl-sorbitol, 1,3:2,4-bis(5',6',7',8'-tetrahydro-2-naphthaldehyde-benzylidene)-1-allyl-xylitol, bis-1,3:2-4-(3',4'-dimethylbenzylidene)-1"-methyl-1-propyl-sorbitol, and 1,3:2,4-bis(3',4'-dimethylbenzylidene)-1-propyl-xylitol.

In the present invention, co-additives used to improve the plate-out performance of polyolefins containing sorbitol-based clarifiers are selected from the group consisting of homopolymers of ethylene oxide, copolymers containing ethylene oxide segments, and polycaprolactone and its derivatives and any combinations of the above compounds.

Sample Preparation

The polypropylenes resins used in the following examples are commercially available. The melt flow rate of both resins is 2 grams/10 minutes. Both contain an additive package consisting of primary and secondary antioxidants, glycerol monostearate, and a sorbitol-based clarifying agent. All masterbatches of coadditives were prepared by dosing in the additives in liquid form into a Leistritz twin-screw extruder, where it was melt compounded with a commercially available polypropylene random copolymer having a melt flow rate of 12 grams per 10 minutes. This compounded mixture was then cooled in a water batch and strand-cut into pellets suitable for use in gravimetric feeders. The two exceptions to this were the molecules used in comparative examples 1 and 3. These molecules were both in solid form when added to the extruder.

EXAMPLE 1

A polypropylene homopolymer having a melt flow rate of 2 grams per 10 minutes as determined by ASTM D1238 was melt processed on a Reifenhauser Mirex-W extruder equipped with an 80 mm, 33:1 L/D screw, and a sheet extrusion die with a symmetrical, coat hanger manifold. From the die the molten sheet was introduced into a three roll polishing upstack. The polypropylene also contained 500 parts per million of glycerol monostearate and 2000 parts per million of a sorbitol acetal clarifying system. All barrel heater controls were set to 230° C., and all die temperatures were set to 250° C. The extruder was run at 100 RPM, yielding an approximate output of 200 kg/hr, and a line speed of approximately 4 meters per minute, and the polishing rolls were set at a temperature, from top to bottom, of 60° C., 70° C., and 60° C. A continuous sheet, having a thickness of 1.2 mm post-polishing stack, was produced for 45 minutes, depositing a substantial amount of yellow-brown plate-out on the polishing rolls.

EXAMPLE 2

The polypropylene from Example 1 was melt processed on the same extruder under conditions identical to Example 1, while adding 2% by weight of a 2.5% masterbatch of Oxirane, methyl-, polymer with oxirane, (phenylimino)di-2,1-ethanediyl ether, diacetate (ester) via side-feeder at the extruder throat. A continuous sheet, having a thickness of 1.2 mm after polishing, was produced for 45 minutes. After this period of time, no noticeable plate-out had been deposited upon the polishing rolls.

EXAMPLE 3

The polypropylene from Example 1 was melt processed on the same extruder and under the same conditions found in example 1. Added to the polypropylene was 2% of a 1% by weight masterbatch of poly(ethylene)glycol with a molecular weight of 1000. A continuous sheet was produced for 45 minutes, and at the end of this time, no plate-out was seen on the polishing rolls.

EXAMPLE 4

The polypropylene from Example 1 was melt processed on the same extruder and under the same conditions found in example 1. Added to the polypropylene via side-feeder was 2% of a 1% by weight masterbatch of polycaprolactone triol with a molecular weight of 300. A continuous sheet having a thickness of 1.2 mm was produced for 45 minutes, and at the end of this time, no plate-out was seen on the polishing rolls.

EXAMPLE 5

The polypropylene from Example 1 was melt processed on the same extruder under the same conditions as Example 1, while adding 1% of a 2.5% masterbatch of 3-methyl-N,N-bis(alkoxylated)aniline via side-feeder at the extruder throat. A continuous sheet, having a thickness of 1.2 mm after polishing, was produced for 45 minutes. After this period of time, no noticeable plate-out had been deposited upon the polishing rolls.

EXAMPLE 6

The polypropylene from Example 1 was melt processed on the same extruder under the same conditions as Example 1, with the exception of the roll stack temperature, which was increased to 80° C./90° C./80° C., from top to bottom. This temperature increase was necessary due to the thinner sheet gauge, 0.7 mm, used in this experiment. Added to this polypropylene via side-feeder was 2% by weight of a 1% masterbatch containing a commercially available surfactant, called Pluronic F38 from BASF, which is an ethylene oxide/propylene oxide copolymer with a hydrophobe molecular weight of 900 and a hydrophile that is 80% of the molecule, by weight. A continuous sheet, 1.2 mm in thickness, was produced for 45 minutes. At the end of the 45 minutes, there was no visual plate-out on the rolls.

EXAMPLE 7

The polypropylene from Example 1 was melt processed on the same extruder and under the same conditions found in Example 1. Added to this polypropylene via side-feeder was 2% by weight of a 1% masterbatch containing a commercially available surfactant, called Pluronic L35 from BASF, which is an ethylene oxide/propylene oxide copolymer with a hydrophobe molecular weight of 900 and a hydrophile that is 50% of the molecule, by weight. A continuous sheet having a thickness of 1.2 mm was produced for 45 minutes, and at the end of this time, no plate-out was seen on the polishing rolls.

EXAMPLE 8

The polypropylene from Example 1 was melt processed on the same extruder and under the same conditions found in Example 7. Added to this polypropylene via side-feeder was 2% by weight of a 1% masterbatch containing a commercially available surfactant, called Pluronic 17R4, which is an ethylene oxide/propylene oxide copolymer with a propylene oxide portion with a molecular weight of 1700 and an ethylene oxide portion that is 40% of the copolymer. A continuous sheet having a thickness of 1.2 mm was produced for 45 minutes, and at the end of this time, no plate-out was seen on the polishing rolls.

EXAMPLE 9

A random copolymer of propylene and ethylene, having a melt flow rate of 2 grams per 10 minutes as determined by ASTM D1238, was melt processed on the Reifenhauser extruder in Example 1, at an approximate rate of 220 kg/hour. All barrel heater controls were set to 220° C., while all die heater controls were set to 230° C. The upper polishing roll was set to 70° C., the middle roll to 80° C., and the lower roll was set to 70° C. The extrudate temperature was observed to be 240° C. A continuous sheet, having a thickness of 1.2 mm after polishing, was produced for 45 minutes, depositing a substantial amount of yellow-brown contaminant on the polishing rolls.

EXAMPLE 10

The polypropylene random copolymer from Example 9 was melt processed on the same extruder under conditions identical to Example 3, while adding two (2) weight percent of a 2.5% masterbatch of 3-methyl-N,N-bis(alkoxylated) aniline via side-feeder at the extruder hopper. A continuous sheet, having a thickness of 1.2 mm after polishing, was produced for 45 minutes. After this period of time, no noticeable plate-out had been deposited upon the polishing rolls.

COMPARATIVE EXAMPLE 1

The polypropylene from Example 1 was melt processed on the same extruder and under the same conditions found in example 1. Added to the polypropylene via side-feeder was 2% of a 1% by weight masterbatch of poly (ethylene)glycol with a molecular weight of 8,000,000. A continuous sheet having a thickness of 1.2 mm was produced for 45 minutes, and at the end of this time, a substantial amount of yellow-brown plate-out existed on the polishing rolls.

COMPARATIVE EXAMPLE 2

The polypropylene from Example 1 was melt processed on the same extruder and under the same conditions found in example 1. Added to the polypropylene via side-feeder was 2% of a 1% by weight masterbatch of poly (propylene)glycol with a molecular weight of 425. A continuous sheet having a thickness of 1.2 mm was produced for 45 minutes, and at the end of this time, a substantial amount of yellow-brown plate-out existed on the polishing rolls.

COMPARATIVE EXAMPLE 3

The polypropylene from Example 1 was melt processed on the same extruder and under the same conditions found in example 1. Added to the polypropylene via a side-feeder was 2% of a 1% by weight masterbatch of poly (ethylene)glycol with a molecular weight of 3,400. A continuous sheet having a thickness of 1.2 mm was produced for 45 minutes, and at the end of this time, a substantial amount of yellow-brown plate-out existed on the polishing rolls.

SUMMARY

| Formulation | Plate-out observation | Example | Haze Performance of 1.2 mm Sheet |
|---|---|---|---|
| Control polypropylene homopolymer | Significant amount of build up on polishing rolls | 1 | ~34 |
| Polypropylene homopolymer with homopolymers of ethylene oxide with molecular weights 3000 and lower, copolymers containing ethylene oxide segments with molecular weights 10000 or lower, and polycaprolactone with molecular weights 10000 and lower and its derivatives and any combinations of the above compounds,. | No build up on chill rolls | 2, 3, 4, 5, 7, 8 | ~31–36 |
| Polypropylene homopolymer with ethylene oxide homopolymers with molecular weights in excess of 3000 and propylene oxide homopolymers | Significant amount of build-up on polishing rolls | Comparative Example 1, 2, 3 | ~33–36 |
| Control ethylene/propylene copolymer | Significant amount of build up on polishing rolls | Example 9 | ~17 |
| Propylene/ethylene copolymer with homopolymers of ethylene oxide with molecular weights 3000 and lower, copolymers containing ethylene oxide segments with molecular weights 10000 or lower, and polycaprolactone with molecular weights 10000 and lower and its derivatives and any combinations of the above compounds. | No build up on chill rolls | Example 10 | ~20 |

The data above indicates clearly that the inventive co-additive has an advantageous effect on plate-out formation from polypropylene on the chill rolls of a sheet extrusion process. This unexpected result is of great value to processors, as it greatly reduces downtime associated with cleaning, and eliminates quality defects associated with the plate-out.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A plastic composition adapted for inhibiting the formation of plate-out, said composition comprising
    (a) at least one polyolefin resin,
    (b) at least one diacetal represented by formula (I)

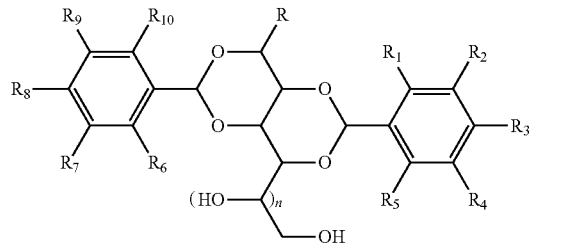

wherein R is selected from the group consisting of: hydrogen atom, alkenyls, alkyls, alkoxys, hydroxyl alkyls, and alkyl halides, and derivatives thereof;

$R_1, R_2, R_3, R_4, R_5, R_6, R_7, R_8, R_9, R_{10}$ are independently selected from the group consisting of: a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, and a 4 or 5 membered alkyl group forming a carbocyclic ring with adjacent carbon atoms of the unsaturated parent ring;

n represents 0 or 1;

(c) a co-additive of ethylene oxide homopolymer with a molecular weight from 200 to 3000, said co-additive being provided in a loading level not to exceed about 5000 parts per million.

2. The composition of claim 1, said composition provides a loading concentration of the diacetal based clarifier of from about 0.01% to about 1%.

3. The composition of claim 1 wherein the diacetal is at least one member selected from the group consisting of dibenzylidene sorbitol, di(p-methylbenzylidene) sorbitol, di(o-methylbenzylidene) sorbitol, di(p-ethylbenzylidene) sorbitol, bis(3,4-dimethylbenzylidene) sorbitol, bis(3,4-diethylbenzylidene) sorbitol, bis(5',6',7',8'-tetrahydro-2-naphthylidene) sorbitol, bis(trimethylbenzylidene) xylitol, and bis(trimethylbenzylidene) sorbitol.

4. The composition of claim 1 wherein said co-additive loading concentration in said polyolefin resin is from about 0.001% to about 0.5%.

5. An article of manufacture comprising the composition of claim 1.

6. A composition comprising
(a) at least one polyolefin resin,
(b) at least one diacetal represented by formula (I)

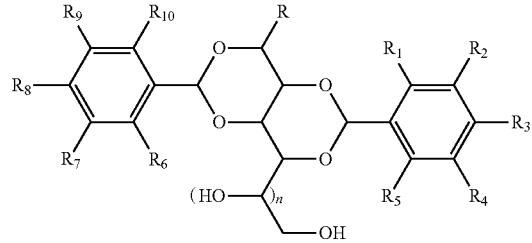

wherein R is selected from the group consisting of: hydrogen atom, alkenyls, alkyls, alkoxys, hydroxyl alkyls, and alkyl halides, and derivatives thereof;
$R_1$, $R_2$, $R_3$, $R_4$, $R_5$, $R_6$, $R_7$, $R_8$, $R_9$, $R_{10}$ are independently selected from the group consisting of: a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, and a 4 or 5 membered alkyl group forming a carbocyclic ring with adjacent carbon atoms of the unsaturated parent ring;
n represents 0 or 1;
(c) at least one co-additive selected from the group consisting of copolymers containing segments of ethylene oxide, said segments having a molecular weight ranging from about 200 to about 10000 and an ethylene oxide percentage ranging from about 10% to about 95% with a loading level of said co-additive not to exceed about 5000 parts per million.

7. An article comprising the composition of claim 6.

8. A composition comprising
(a) at least one polyolefin resin,
(b) at least one diacetal represented by formula (I)

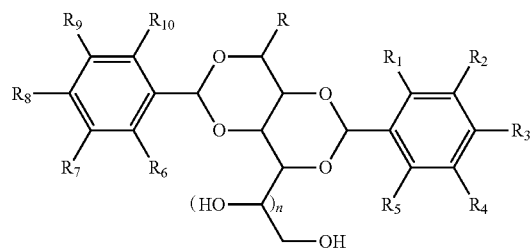

wherein R is selected from the group consisting of: hydrogen atom, alkenyls, alkyls, alkoxys, hydroxyl alkyls, and alkyl halides, and derivatives thereof;
$R_1$, $R_2$, $R_3$, $R_4$, $R_5$, $R_6$, $R_7$, $R_8$, $R_9$, $R_{10}$ are independently selected from the group consisting of: a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, and a 4 or 5 membered alkyl group forming a carbocyclic ring with adjacent carbon atoms of the unsaturated parent ring;
n represents 0 or 1; and
(c) at least one co-additive selected from the group consisting of polycaprolactone, polycaprolactone diol, polycaprolactone triol, polycaprolactone tetraol, and combinations thereof, said co-additive having a molecular weight ranging from 300 to 10000 with a loading level not to exceed 5000 parts per million.

9. An article comprising the composition of claim 8.

10. An additive composition adapted for inhibiting the formation of plate-out in a polyolefin resin, said additive composition comprising
(a) at least one diacetal represented by formula (I)

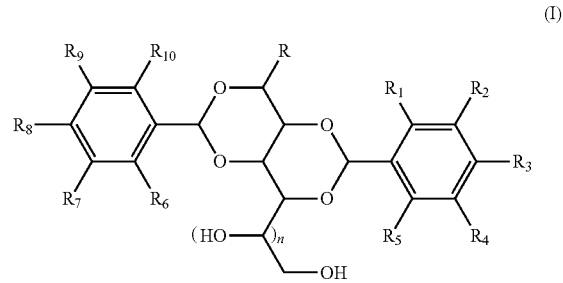

wherein R is selected from the group consisting of: hydrogen atom, alkenyls, alkyls, alkoxys, hydroxyl alkyls, and alkyl halides, and derivatives thereof;
$R_1$, $R_2$, $R_3$, $R_4$, $R_5$, $R_6$, $R_7$, $R_8$, $R_9$, $R_{10}$ are independently selected from the group consisting of: a hydrogen atom, an alkyl group having 1 to 8 carbon atoms, an alkoxy group having 1 to 4 carbon atoms, an alkoxycarbonyl group having 1 to 4 carbons, a halogen atom, an hydroxy group, an alkylthio group having 1 to 6 atoms, an alkylsulfoxy group having 1 to 6 carbon atoms, and a 4 or 5 membered alkyl group forming a carbocyclic ring with adjacent carbon atoms of the unsaturated parent ring;
n represents 0 or 1; and
(b) a co-additive of ethylene oxide homopolymer with a molecular weight ranging from about 200 to about 3000, said co-additive being provided in a loading level not to exceed 5000 parts per million.

11. An article of manufacture comprising a thermoplastic resin and the additive of composition of claim 10.

* * * * *